Patented May 23, 1944

2,349,557

UNITED STATES PATENT OFFICE 2,349,557

STABILIZED DIAZO DICYANDIAMIDE COMPOUND

Paul P. McClellan, Old Greenwich, and Walter P. Ericks, Stamford, Conn., assignors to American Cyanamid Company, New York, N. Y., a corporation of Maine No Drawing. Application August 27, 1942, Serial No. 456,410

5 Claims. (Cl. 260—140)

This invention relates to a new class of chemical compounds, to intermediates and dyes obtained therefrom, and to their methods of preparation.

The principal object of this invention is to prepare new stabilized diazo compounds, preferably those soluble in water and in the more commonly used organic solvents.

Among the stabilized diazo compounds included herein are, more especially, the reaction products of an ice color diazo component with an alkylol or an alkoxyalkylol derivative of dicyandiamide. Inasmuch as these derivatives each exist in several tautomeric forms, the reaction products prepared from any one may occur as a mixture of isomers which readily undergo rearrangement. Hence, assignment of a definite chemical formula is problematical.

However, the chemical properties of the products and the particular method or methods of preparation disclosed herein cause one of the isomers to appear in excess, and under the present conditions the monomeric form is produced predominantly. Thus the alkylol and alkoxyalkylol dicyandiamide derivatives probably have the formula:

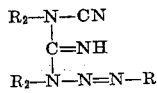

wherein R represents the nucleus of an aromatic amine such as the nucleus of an ice color diazo component; and $R_2$ is an alkylol or alkoxyalkylol group.

These stabilized diazo compounds are resistant to percussion and even when heated in a direct flame decompose without the hazard of an explosion. When in a dry condition or in an alkaline solution they are stable at temperatures normally encountered throughout all seasons of the year, and hence may be stored indefinitely. However, these reaction products possess the property of splitting into their original components by treatment with acids at elevated temperatures or with steam containing volatile acid vapors. If this splitting occurs in the presence of an ice color coupling component the regenerated active diazotized component becomes available immediately for reaction with the coupling component and produces the corresponding azo pigment or dye.

To this end it is a further object of this invention to prepare new azo pigments and dyes by mixing an ice color coupling component and the reaction product of an ice color diazo component with an alkylol or alkoxyalkylol derivative of dicyandiamide. As such, the mixture may or may not be colored. However, if a textile material is printed or impregnated with this mixture and then heated in the presence of an acid, the acid hydrolyzes the stable diazo compound, splitting it into its components; and the regenerated diazotized component liberated couples with the ice color component to form an azo pigment or dye.

This acid treatment or ageing as it is called, is preferably effected with a weak acid and at an elevated temperature. Usually formic or acetic acids are used, but various other acids as well as substances liberating acids upon being steamed such as ammonium sulfate, esters of tartaric, succinic, etc., acids may be used particularly when the printed material is subjected to a subsequent steam treatment to effect ageing or develop the color.

Stable alkaline printing pastes can be prepared from the mixture of the ice color coupling component and the reaction product of the ice color diazo component with one of the alkylol or alkoxyalkylol derivatives by dissolving the mixture in a solvent such as water, alcohol, acetone, etc., together with various other ingredients such as alkalies, organic bases, impregnating agents, thickeners such as starch, gum, etc., well known to those skilled in the art. Cotton goods can be printed with this paste with the aid of a copper roll. The print is then dried and subsequently the desired color is developed by steaming in the presence of acetic acid or other volatile acid vapors. In this manner an insoluble azo pigment is produced in and on the cotton fibers in the form of the printed pattern. Such prints are bright and possess remarkable fastness to light and washing.

The facility with which the compounds and dyes included in this invention can be used is based upon the ease with which the stabilized diazamino group present can be split and converted into an active diazo group by heating in the presence of an acid or an acid liberating substance. This conversion or ageing is usually effected in a steam chamber and in the presence of a coupling component (e. g. naphthol in the examples given below) to develop or form the color.

The following examples describe the preparation of several stabilized diazo compounds included in this invention and further give details as to their use in dyeing and printing textile materials.

EXAMPLE I

*Diethyloldicyandiamide reacted with p-toluidine diazonium hydrochloride*

The diethyloldicyandiamide used in this experiment was prepared as follows: 336 g. of dicyandiamide, 1000 g. of ice and 384 g. of ethylene oxide were charged into a pressure bomb. The bomb was shaken and heated within two hours to 75° C. At this temperature an exothermic reaction took place. The heating was temporarily stopped and then again continued, keeping the temperature at 90°–125° C. for two hours. The solution was then concentrated and analyzed for nitrogen.

To 21.4 g. of p-toluidine in 160 g. of water 42 g. of concentrated hydrochloric acid was added. The mixture was stirred until the hydrochloride formed was dissolved completely. 160 g. of crushed ice was added to the solution. When the temperature was 5° C. 17 g. of sodium nitrite dissolved in 30 cc. of water was added. The solution was stirred for 30 minutes at 5°–10° C., at which time the diazotization was completed. The p-toluidine diazonium hydrochloride obtained was reacted with diethylol dicyandiamide solution prepared as follows:

145 g. of 71.4% aqueous diethyloldicyandiamide aqueous solution, 250 g. of water, 16 g. of sodium hydroxide and 53 g. of sodium carbonate were stirred until the sodium hydroxide was dissolved. The mixture was cooled by addition of 250 g. of crushed ice and while the stirring was continued the above p-toluidine diazonium hydrochloride solution was added. In order to keep the solution cool an additional 250 g. portion of ice was added and after stirring for 14 hours the reaction was substantially completed. The small quantity of tarry material formed was filtered off and the stabilized diazo compound was salted out by addition of 40 g. of sodium carbonate to the filtrate and stirring for two hours. The stabilized diazo and the undissolved portion of sodium carbonate were filtered off. The probable formula of the compound was:

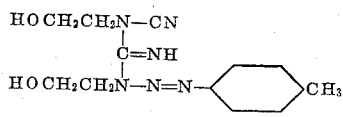

When the stabilized diazo compound was added to sodium naphthoxide solution no color was produced even on warming; however, when this solution was acidified and boiled, a red dye formed rapidly. A piece of cotton cloth was introduced into the alkaline solution containing the above diazo compound and sodium naphthoxide. The solution was heated to 80° C. and acidified with acetic acid. The cloth was dyed red and the color produced was resistant to washing. The stabilized diazo compound was readily soluble in alcohol, acetone and cellosolve and less soluble in water.

Any one of a number of coupling components known to those versed in the art can be admixed with this diazo compound, such as 1-naphthol, the o-toluidide of 2,3-hydroxy-naphthoic acid, the 2,5-dimethoxy anilide of 2,3-hydroxy-naphthoic acid, or the 4-chloranilide of 2,3-hydroxy-naphthoic acid. When mixed with an alkaline aqueous alcohol solution of sodium α-naphtholate it showed a very high degree of stability and no formation of dyestuff occurred. Coupling took place immediately upon acidification of this mixture with acetic acid while heating to yield a red dye.

EXAMPLE II

*Di(2-hydroxypropylol-1) dicyandiamide reacted with p-toluidine diazonium hydrochloride*

21.4 g. of p-toluidine was diazotized in the same manner as in the previous example and reacted with di-(2-hydroxypropylol-1) dicyandiamide prepared by the following method.

42 g. of dicyandiamide, 74 g. of glycidol and 74 g. of water were stirred and heated to 100° C. At this temperature a clear solution was obtained and an exothermic reaction set in. The heating was discontinued and the temperature was maintained at 98°–103° C. by occasional cooling of the reaction vessel with ice water. The exothermic reaction subsided within about 15 minutes and the solution was cooled to room temperature. 16 g. of sodium hydroxide, 53 g. of sodium carbonate, 200 g. of water and 200 g. of crushed ice were added to the above solution. The mixture was stirred for one-half hour and reacted in the di(2-hydroxypropylol-1) dicyandiamide solution by the procedure analogous to the reaction of p-toluidine diazonium hydrochloride with diethyloldicyandiamide described in the example above. The stabilized diazo obtained was soluble in alcohol, acetone, butyl carbitol and less soluble in water, and produced a red dye when coupled in an acid solution with 1-naphthol at 80° C.

The probable structure of the stabilized diazo compound is as follows:

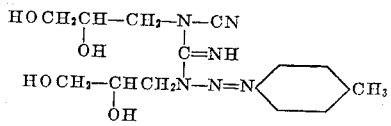

Similarly, various other members of the alkylol and alkoxyalkylol series of derivatives of dicyandiamide may be obtained by using as a starting material the corresponding compound containing a reactive ethylene oxide ring and a corresponding substituent in the ethylene oxide ring. Thus instead of ethylene oxide, one or more mol. of glycidol, propylene oxide, isopropylene oxide, butylene oxide, isobutylene oxide, etc. etc., can be used in order to render the stabilized diazo compound water soluble. A number of such compounds are described in the copending applications Serial Numbers 289,393 and 289,400 of Walter P. Ericks.

EXAMPLE III

An alternative method for preparing the compounds of Example II is given hereinbelow.

53 g. of o-toluidine was dissolved in 250 ml. of water to which 110 ml. of concentrated hydrochloric acid had been added. To the solution was added 500 g. of crushed ice and 35 g. of sodium nitrite dissolved in 100 ml. of water. The solution was stirred for 15 minutes and then poured into a solution of 44 g. of dicyandiamide dissolved in two liters of water. While stirring the solution 26 g. of sodium hydroxide and 10.6 g. of sodium carbonate dissolved in 100 ml. of water was added. The solution was stirred for 15 minutes at 0°–5° C. and was then acidified with 20 ml. of concentrated hydrochloric acid. The yellow precipitate which formed during this operation was filtered off, placed in a flask and covered with 700 ml. of water. 6 g. of sodium hydroxide dissolved in 100 ml. of water and 74 g. of glycidol were added to the mixture and the latter was heated at 70°–75° C. for 15 minutes. The resulting solution was cooled to 10° C. and adjusted with hydrochloric acid to a pH of about 7.5. A small portion of unreacted diazoamidino compound which precipitated during this operation was filtered off. The filtrate was evaporated under reduced pressure at 40° C. until a thick slurry of sodium chloride had formed. The mixture was filtered. The filtrate was a syrupy, orange liquid. The solubilized diazoamidino compound when heated with sodium 1-naphthoxide and subsequently acidified formed a red pigment.

The probable formula of the stabilized diazo compound is the same as given above under Example II.

EXAMPLE IV

*Preparation and solubilization of 2-methyl-5-chlorobenzenediazo dicyandiamide*

53.1 g. of 2-methyl-5-chloroaniline hydrochloride in 250 ml. of water and 400 g. of crushed ice were diazotized with 20.8 g. of sodium nitrite and 78.6 g. of concentrated hydrochloric acid by stirring the mixture for 30 minutes at 5° C. The 2-methyl-5-chlorobenzenediazonium chloride was added to 26.8 g. of dicyandiamide dissolved in 1500 g. of water at 5° C., and to this solution were added 14.5 g. of sodium hydroxide and 10.3 g. of sodium carbonate, both dissolved in 50 ml. of water. The yellow 2-methyl-5-chlorodiazodicyandiamide which formed on stirring the solution for 30 minutes was filtered off and washed with three small portions of ice water. The filter cake was placed in a flask containing 500 ml. of water. To the paste thus formed was added 24 g. of sodium hydroxide dissolved in 100 ml. of water and 48.5 g. of ethylene chlorohydrin. The paste was stirred and heated at 50° C. until most of it dissolved. The undissolved portion was filtered off and the filtrate, an orange-colored liquid, was most likely the aqueous solution of 2-methyl-5-chlorobenzenediazodiethyloldicyandiamide. The solution of the stabilized diazo coupled with naphthol AS when the solution was acidified and heated.

The probable formula of the stabilized diazo compound was:

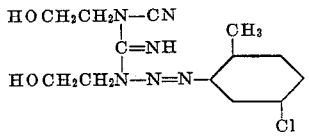

It is to be particularly noted that although for ease of description, the aromatic amine chosen in the examples illustrating specific embodiments of the invention was p-toluidine, various other stable diazo compounds can be prepared from practically any ice color diazo component. Thus other typical amines which can be diazotized and reacted with the stabilizing components include in addition to p-toluidine, among numerous others familiar to those versed in the art, aniline as well as homologues of aniline, namely 2,4-dimethylaniline. Where still other color variations are desired, the halogen derivatives of aniline may be used, such as the monochloroanilines, dichloroanilines; anilines substituted by hydrocarbon radicals, such as alkyl, alkoxy radicals, for example methyl, ethyl, etc., methoxy, ethoxy, or the like; or anilines substituted by nitro radicals, acyl derivatives thereof, and the like.

Similarly, although 1-naphthol is given as the most frequently used coupling component for the dye mixture incorporating the specific stabilized diazo compounds, various other naphthols, such as naphthol AS, toluidides, pyrazolones, coupling arylides, particularly arylides of 2,3-hydroxy-naphthoic acid, other hydroxy or amino-naphthoic acid, carbazole-carboxylic acid, hydroxy-anthracene carboxylic acid, antraquinone carboxylic acid, the anilide of 2,3-hydroxy-naphthoic acid, or the like, may be used as coupling components.

This case is a continuation-in-part of our co-pending application, Serial No. 369,806, filed Dec. 12, 1940.

It is to be understood that the examples herein given are merely illustrative and not limitative embodiments of this invention which is to be construed broadly and limited solely as defined by the scope of the appended claims.

We claim:

1. A stabilized diazo compound having the general formula:

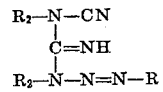

in which R is the nucleus of an ice color diazo component of the benzene series and R₂ is selected from the group consisting of a lower alkylol and alkoxyalkylol group.

2. A stabilized diazo compound having the formula:

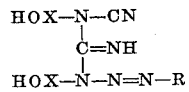

in which R is the nucleus of an ice color diazo component of the benzene series and X is a saturated aliphatic radical of the lower alkyl group.

3. A stabilized diazo compound having the formula:

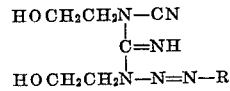

in which R is the nucleus of an ice color diazo component of the benzene series.

4. A stabilized diazo compound having the formula:

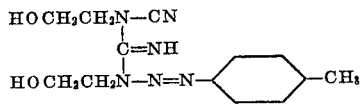

5. A stabilized diazo compound having the formula:

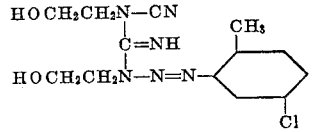

PAUL P. McCLELLAN.
WALTER P. ERICKS.